(12) United States Patent
Exeter et al.

(10) Patent No.: US 9,336,687 B2
(45) Date of Patent: May 10, 2016

(54) METHOD FOR PROVIDING LEARNING COURSES VIA A SERVICE CENTER SUPPORTING A VARIETY OF PRODUCTS

(75) Inventors: Gershwin Allson Lamont Exeter, Toronto (CA); Nancy Rush Vesey, Union, NJ (US); Bruce A. Sharpe, Aurora, CO (US)

(73) Assignee: TELETECH HOLDINGS, INC., Englewood, CO (US)

( * ) Notice: Subject to any disclaimer, the term of this patent is extended or adjusted under 35 U.S.C. 154(b) by 561 days.

(21) Appl. No.: 13/270,671

(22) Filed: Oct. 11, 2011

(65) Prior Publication Data
US 2013/0089848 A1    Apr. 11, 2013

(51) Int. Cl.
G09B 3/00    (2006.01)
G09B 7/00    (2006.01)

(52) U.S. Cl.
CPC ..................... G09B 7/00 (2013.01)

(58) Field of Classification Search
CPC ........................................... G09B 7/00
USPC ............. 434/322, 323, 350; 709/217; 705/1.1
See application file for complete search history.

(56) References Cited

U.S. PATENT DOCUMENTS

| | | |
|---|---|---|
| 6,212,178 B1 | 4/2001 | Beck et al. |
| 6,226,623 B1 | 5/2001 | Schein et al. |
| 6,690,788 B1 | 2/2004 | Bauer et al. |
| 6,819,759 B1 | 11/2004 | Khuc et al. |
| 6,934,381 B1 | 8/2005 | Klein et al. |
| 6,988,126 B2 | 1/2006 | Wilcock et al. |
| 7,165,213 B1 | 1/2007 | Busey |
| 7,418,092 B2 | 8/2008 | Brown |
| 7,450,567 B1 | 11/2008 | Mamnani |
| 7,496,053 B1 | 2/2009 | Seabaugh |
| 7,558,382 B2 | 7/2009 | Torres et al. |
| 7,658,327 B2 | 2/2010 | Tuchman et al. |
| 7,746,362 B2 | 6/2010 | Busey et al. |
| 7,761,321 B2 | 7/2010 | Kannan et al. |
| 7,787,609 B1 | 8/2010 | Flockhart et al. |
| 2005/0246211 A1* | 11/2005 | Kaiser ............................... 705/7 |
| 2006/0171402 A1 | 8/2006 | Moore et al. |
| 2006/0178918 A1* | 8/2006 | Mikurak ........................... 705/7 |
| 2006/0218061 A1 | 9/2006 | Mouline |

(Continued)

OTHER PUBLICATIONS

"Afaria OneTouch" iAnywhere Solutions, Inc., Dublin, California, 2005, 2 pages.

(Continued)

*Primary Examiner* — Kesha Frisby
(74) *Attorney, Agent, or Firm* — Blakely, Sokoloff, Taylor & Zafman LLP

(57) ABSTRACT

A service center receives a request from a remote device for accessing a learning course describing operations of a product that has been registered with the service center. In response to the request, a media stream representing the learning course is transmitted to the remote device to allow a user of the remote device to navigate the learning course, without requiring the user to directly access a training facility of a product provider associated with the registered product. User interaction with the learning course is tracked and analyzed to generate an analysis result, where the analysis result is utilized to generate or identify a subsequent learning course specifically tailored to the user. The analysis result is transmitted to the product provider to allow the product provider for the purpose of determining customer satisfaction.

26 Claims, 6 Drawing Sheets

(56) References Cited

U.S. PATENT DOCUMENTS

| | | |
|---|---|---|
| 2007/0041523 A1 | 2/2007 | Paden et al. |
| 2007/0083472 A1* | 4/2007 | Israel .............................. 705/55 |
| 2007/0160188 A1 | 7/2007 | Sharpe et al. |
| 2007/0276722 A1 | 11/2007 | Silvera et al. |
| 2007/0293200 A1 | 12/2007 | Roundtree et al. |
| 2008/0074264 A1 | 3/2008 | Sharpe et al. |
| 2008/0140438 A1 | 6/2008 | Bares |
| 2008/0195659 A1 | 8/2008 | Rawle |
| 2009/0282106 A1* | 11/2009 | Jaffer et al. ................... 709/206 |
| 2010/0030881 A1 | 2/2010 | Moreira Sa de Souza et al. |
| 2010/0036736 A1* | 2/2010 | McGee et al. ............. 705/14.55 |
| 2010/0161345 A1* | 6/2010 | Cain et al. ........................ 705/2 |
| 2010/0205540 A1 | 8/2010 | Gupta et al. |
| 2011/0055100 A1* | 3/2011 | Perreault et al. .............. 705/327 |

OTHER PUBLICATIONS

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

International Search Report and Written Opinion mailed Jan. 4, 2013, for International Application No. PCT/US2012/059786, 8 pages.

* cited by examiner

METHOD FOR PROVIDING LEARNING COURSES VIA A SERVICE CENTER SUPPORTING A VARIETY OF PRODUCTS

FIELD OF THE INVENTION

Embodiments of the present invention relate generally to providing product services. More particularly, embodiments of the invention relate to providing training courses associated with products supported by a service center.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PTSN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Similarly, stores may only staff an anticipated amount of in-store associates for support purposes. Contact centers have to deal with a limited number of agents to handle a large number of incoming customer calls.

As the Internet is getting more popular, customer service providers now provide for computer-based customer service interaction by way of the World Wide Web. Instead of initiating a customer service session by using the phone or speaking with an in-store associate, customers may access a website and engage in a web-based customer service session to make inquiries (e.g., technical support) and/or perform tasks (e.g., paying bills). Web-based customer service sessions offer numerous advantages over teleconference-based sessions. For example, the graphical user interface of web-based customer service applications permit customers to view illustrations or written explanations and thus ameliorate the miscommunications which may arise with oral conversations between a customer service agent and a customer.

Further, web-based customer service sessions enable a customer to directly target his/her needs on the website and thus reduce the time expended both in navigating through a series of vocal menu choices inapplicable to the consumer's particular needs and in waiting to speak to a service agent. Significantly, web-based customer service sessions are particularly cost-effective for the customer service provider given that fewer agents are required to support customers. Indeed, customers are provided functionality for finding answers to their questions or performing tasks without any help from a live agent. These customer service sessions may be entirely computer-based or, alternatively, involve interaction with a customer service agent.

Online training, also referred to as eLearning, has been widely provided over the Internet in recent years. Typically, a user can browse through an article or interactive training session in a form of multi-media. There has been a lack of online training options provided by a support center in an efficient way. Typically, online training is provided by a product manufacturer or a retailer that is specifically tailored to the manufacturer or a retailer. Such an implementation sometimes tends to be more expensive and inefficient to maintain. The online training tends to be one-way presentation and customer satisfaction of the online training is limited. There has also been a lack of efficient mechanism to utilize user interaction with the training for other uses.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
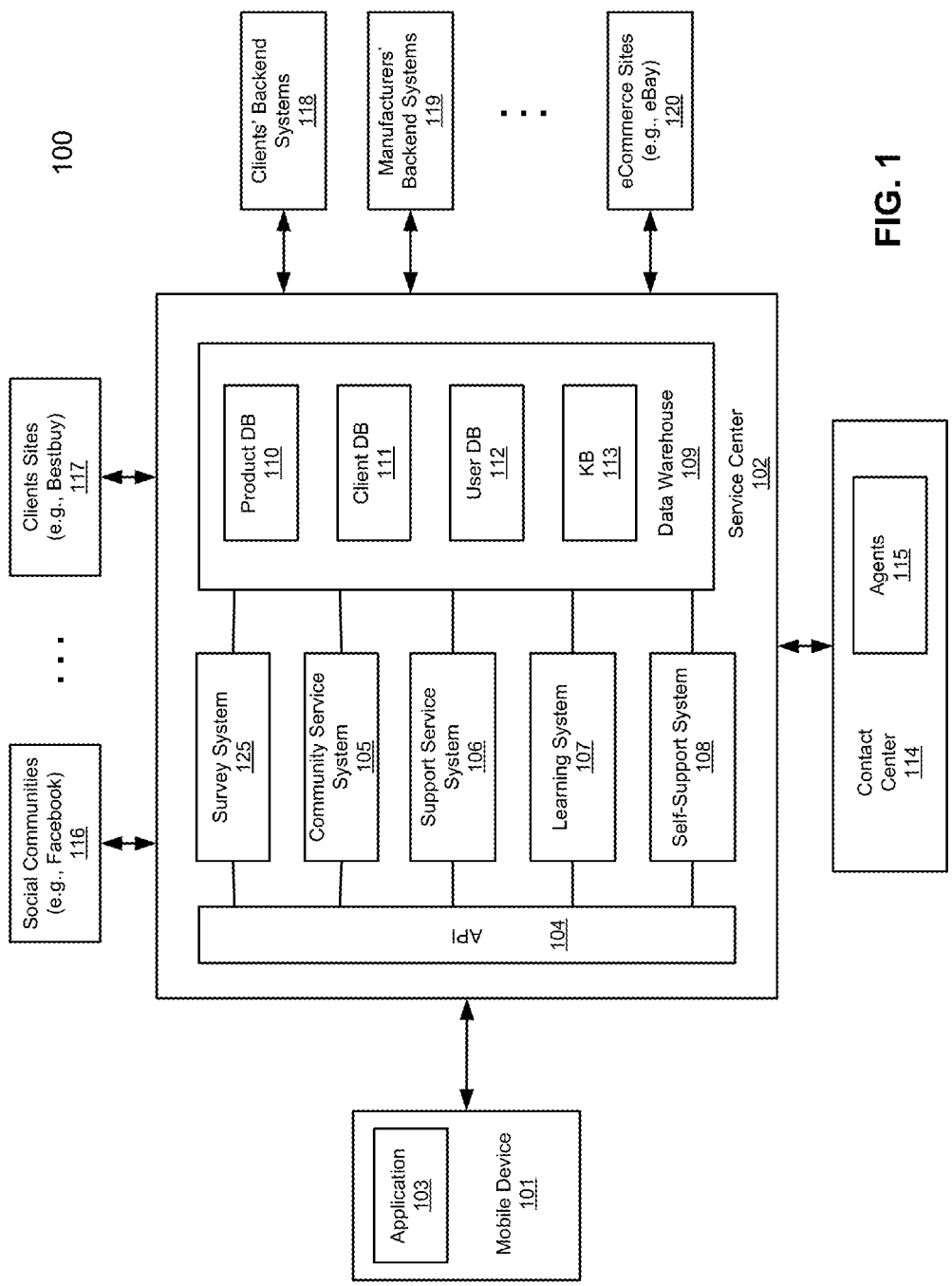
FIG. 1 is a block diagram illustrating a system for providing life cycle services to products according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a service center (also referred to as a support center) is configured to provide online training courses regarding a product supported by the service center on behalf of a product provider. The product may be acquired by the user and registered with the service center. The courses are provided to users by the service center on behalf of a product provider that provides the product. In one embodiment, in response to a request for accessing an online course, a learning system of the service center identifies, renders, and transmits a course segment to a remote device of a user. The request may include a machine-readable code (e.g., quick response (QR) code) that is obtained via a mobile device of the user by scanning the machine-readable code disposed on a product using a scanner or camera of the mobile device. The course or courses are identified based on the machine-readable code without having the user to specifically provide detailed information identifying the courses. Based on the machine-readable code, functional capabilities of the mobile device may also be determined by the service center. The courses may be further rendered (e.g., in a form of a media stream) in view of the capabilities of the mobile device such that the courses can be properly presented by the mobile device.

While the user navigates the course segment, according to one embodiment, user interaction with the course is tracked and captured by the service center. The user interaction may be monitored and tracked by an application running at the mobile device and transmitted from the mobile device to the service center over a network. An analysis is performed by the service center on the tracking data and an analysis report is generated. The analysis report may be provided to the product provider to allow the product provider to determine customer satisfaction or other product and marketing purposes (e.g., targeted advertisements). For example, based on the analysis, another product may be presented to the user as a suggestion that may help solving user's concerns. The analysis report can also be utilized to customize further courses for the user or for other users. The analysis report can also be utilized to generate a new article or modify an existing article of a self-support knowledgebase (e.g., Web site hosting solutions to common issues such as frequently asked questions or FAQ). The analysis report may also be utilized to update or spin off a discussion thread for further discussion in an online community or social community.

According to one embodiment, a course is presented in a manner such that a user can get in touch with an agent for live support, a specialist associated with a self-support knowledgebase, friends of a social community to further engage discussions of topics associated with the course. In one embodiment, if the user is unsatisfied with a description of a particular course, the user can instantly activate an embedded control (e.g., button) at a particular place in time to request a further help or access additional information related to the course. For example, during navigating a course, a user can activate a control or button embedded or associated with the course to request a live support with an agent or specialist. Based on the request received at the service center, an agent who is familiar with the description of the course or product is identified and selected to get in touch with the user via a communications channel (e.g., voice, chat, email) that is preferred by the user and is available (e.g., based on a configuration of a client that is associated with the course) to the agent. Alternatively, the user can activate a control or button from the course to access a self-support knowledgebase (e.g., Web site) for a particular article that is related to the content of the course. Furthermore, the user can also activate a control or button from the course to access or participate in a discussion forum of a social community that is related to content of the course.

FIG. 1 is a block diagram illustrating a system for providing life cycle services to products according to one embodiment of the invention. Referring to FIG. 1, system 100 includes a mobile device 101 of a user, customer, or individual communicatively coupled to service center 102 over a network. The network may be any kind of networks. Mobile device 101 may be any kind of mobile devices including, but is not limited to, a laptop, mobile phone, tablet, media player, personal digital assistant or PDA, etc.

Service center 102 may be implemented in a centralized facility or server. Alternatively, service center 102 may be implemented in multiple facilities or servers in a distributed manner (e.g., cloud-based service platforms). Service center 102 provides services to a variety of products or services from a variety of clients or vendors. A client may be a manufacturer, a distributor, a retailer, a service provider or broker, a purchasing facility (e.g., Amazon™, Expedia™, or ISIS™), or a combination thereof. In one embodiment, service center 102 includes service APIs 104 to communicate with other systems such as mobile device 101, client's site 117, social communities 116, contact center 114 including agents or experts 115, client backend systems 118, manufacturer backend systems 119, eCommerce sites 120 and other auxiliary systems (e.g., billing system). Service center 102 can handle service requests from customers of multiple clients. For example, a service center may handle customer service requests for a number of retail sales companies, sales calls for catalog sales companies, and patient follow-up contacts for health care providers. In such a structure, the service center may receive service requests directly from the customers or through client support management systems.

In one embodiment, service center 102 further includes community service system 105, support services system 106, learning system 107, self-support system 108, and data warehouse 109. Support services system 106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application. Further detailed information concerning service center 102 and/or support service system 106 can be found in co-pending U.S. patent application Ser. No. 13/085,397, filed Apr. 12, 2011, which is incorporated by reference in its entirety.

In one embodiment, community service system 105 is responsible for communicating with social communities 116 via an API, for example, to post a message received from a user and to route the responses received from social communities 116 back to the user. Service center 102 further includes a post market service system (not shown) that is responsible for handling post market activities associated with the registered products, including selling a registered product on eCommerce sites 120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, the post market service system of service center 102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Similarly, a user can also post a message to one or more of the registered social communities from the application running within the mobile device without having to individually access the social communities. In one embodiment, a user can transmit a request from mobile device 101 to service center 102, where the request includes a message to be posted and one or more community identifiers identifying one or more registered social communities. In response, community service system 105 of service center 102 is configured to retrieve the associated credentials from the database and to post the message to the specified social communities together with the associated credentials allowing the social communities to authenticate the user, without having to prompt the user for their same credentials each time. Further detailed information concerning community service system 105 and/or the post market service system can be found in co-pending U.S. patent application Ser. No. 13/185,213, filed Jul. 18, 2011, which is incorporated by reference herein in its entirety.

In one embodiment, service center 102 further includes a messaging or advertisement system (not shown) that is responsible for handling any messages received from a variety of partners or parties, such as client sites 117, client backend systems 118, manufacturer backend systems 119, and eCommerce sites 120. Messages may be related to the registered products of the user, such as, promotions, rewards, and recall messages. Messages may include advertisements from a variety of advertisement providers.

In one embodiment, a user can configure a set of one or more rules to specify whether certain types of messages or advertisements received from vendors or parties (e.g., retailers, manufacturers, social communities, or other advertisement providers), which may or may not be related to a registered product, should be routed to the user. These rules serve as part of message delivery or filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

According to another embodiment, an advertisement received from a vendor (e.g., a client to the service center) is delivered by the service center to a mobile device of a user based on a set of delivery rules associated with the user. The advertisement is displayed on a display of the mobile device by an application running therein. In addition, the service center and/or the application are configured to track interactions of the user with respect to the displayed advertisement to determine user behaviors, patterns, or trends in view of the displayed advertisement. An analysis is performed on the user interaction and the result of the analysis may be utilized to configure further advertisement delivery by the service center and/or the vendors.

According to another embodiment, service center 102 is configured to identify users that have at least one common product registered with the service center and are also members of a social community. The service center is configured to send a message to those users to invite them to connect (e.g., becoming friends or following a friend) with each other via the social community. The social community is hosted by a third party and communicatively coupled to the service center over a network. The service center may also deliver messages or items posted by one of those users to another one of those users on behalf of the social community, without requiring such users to individually or directly accessing the social community. The service center can also deliver messages or items to a particular user posted by other users of the social community, where the messages or items are related to a registered product of that particular user.

According to a further embodiment, an application running on a mobile device provides a user friendly graphical user interface (GUI) to allow a user to configure a set of one or more delivery rules concerning whether certain types of messages or advertisements should be received at the mobile device from a service center. The service center is configured to deliver messages or advertisements on behalf of a message or advertisement provider, which can be a client to the service center, a retailer, a manufacturer, a social community, or other content providers. A user can utilize the GUI to configure, for each of the providers, whether a message associated with a particular registered product of the user or all products in general related to the provider should be received by the mobile device. The settings of the delivery rules are then transmitted from the mobile device to the service center to allow the service center to deliver subsequent messages or advertisements on behalf of the message or advertisement providers accordingly. Further detailed information concerning the advertisement system can be found in co-pending U.S. patent application Ser. No. 13/185,309, filed Jul. 18, 2011, which is incorporated by reference herein in its entirety.

In one embodiment, data warehouse 109 includes product database 110, client database 111, user database 112, and knowledgebase 113. Product database 110 is configured to store any data related to the registered products including user manuals, etc. Client database 110 is configured to store information related to clients such as client's preferred communications mechanisms. User database 112 is used to store information related users, such as, for example, registered products associated with a user, communications channel preference of a user, credentials necessary for a user to access other sites, and/or messaging filtering settings of a user, etc. Knowledgebase 113 is used to store knowledge collected and compiled over a period of time, which can be used by agents 115 and/or users for self-support purposes.

In one embodiment, service center 102 further includes a multi-channel communication system (not shown) to provide one or more communication channels to any user or client to concurrently access service center 102. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication system may be fully or partially integrated with service center 102 or alternatively, it may be maintained or provided by a third party or partner (e.g., communicatively coupled via service API 104 over a network). Service center 102 further includes an automatic caller distribution (ACD) system (not shown) to receive, route, and manage voice calls exchanged via the multi-channel communication system.

A customer can obtain support services from service center 102 via a variety of communication mechanisms. A customer can initiate a support request to contact a live agent such as agents 115 in a live manner. Alternatively, a customer may browse certain knowledgebase, such as KB 113 via self-support system 108, in an attempt to find a solution to a problem of a product he/she purchased from a manufacturer via a client of service center 102.

According to one embodiment, service center 102 further includes a security system (not shown) to authenticate a user of mobile device 101 in order to allow the user accessing services provided by any of systems 105-108. The security system is configured to provide multiple login and authentication options to a mobile device to allow a user to select one or more of the options to access service center 102. The login/authentication options include, but are not limited to, a traditional username and password login/authentication option, a voice login/authentication option, and an image login/authentication option. These options can be utilized individually or in combination dependent upon a particular user configuration or preference, which may be specified and stored in a user profile maintained by service center 102, as part of user database 112. One login/authentication option can be utilized in addition to another login/authentication option or alternatively, one login/authentication option can be utilized as a backup option when another login/authentication option fails.

In one embodiment, in response to a user selection of a voice login option, the security system causes mobile device 101 to present predefined one or more phrases and to request the user to speak the presented content to a microphone of the mobile device. A voice recorder of mobile device 101 is configured to capture a voice stream representing the one or more phrases spoken in real time by the user. Mobile device 101 then transmits the captured voice stream to service center 102 over a network. In response, the security system is configured to authenticate the user by matching the received voice stream against another voice stream that has been previously registered and stored in a database associated with the user of the service center.

Similarly, a user can also initiate an image or video login option from its mobile device. According to one embodiment, in response to a user selection of an image login option, mobile device 101 requests the user to capture one or more images of the user at the point in time using a camera of mobile device 101. Mobile device 101 then transmits the captured image(s) to service center 102 over a network. In response, the security system of service center 102 is configured to authenticate the user by matching the received image(s) against other image(s) that have been previously registered and stored in a database associated with the user of the service center. The previously recorded voice and/or image references may be stored, for example, by a registration system (not shown), in a user account as part of user database 112. Once the service center has successfully authenticated the user, the user can obtain support services or access resources available from the service center as described above regarding one or more products or services that have been registered by the user. Further detailed information concerning the security system can be found in co-pending U.S. patent application Ser. No. 13/213,000, filed Aug. 18, 2011, which is incorporated by reference herein in its entirety.

According to one embodiment, service center 102 further includes learning or training system 107 configured to provide learning courses to users on products that are supported by service center 102 on behalf of product providers (e.g., clients). In one embodiment, in response to a request for accessing an online course, learning system 107 identifies, renders, and transmits a course segment to a remote device of a user. While the user navigates the course segment, according to one embodiment, user interaction with the course is tracked and captured by learning system 107. An analysis is performed by learning system 107 on the tracking data and an analysis report is generated. The analysis report may be provided to the product provider to allow the product provider to determine customer satisfaction or other product and marketing purposes (e.g., targeted advertisements). The analysis report can also be utilized to customize further courses for the user or for other users. The analysis report can also be utilized to generate a new article or modify an existing article of a self-support knowledgebase (e.g., Web site hosting solutions to common issues such as frequently asked questions or FAQ). The analysis report may also be utilized to update or spin off a discussion thread for further discussion in an online community or social community.

According to one embodiment, a course is presented in a manner allowing a user to get in touch with an agent for live support via support service system 106, a specialist associated with a self-support knowledgebase via self-support system 108, friends of a social community to further engage discussions of topics associated with the course via community service system 105. In one embodiment, if the user is unsatisfied, which may be determined by survey system 125, with a description of a particular course, the user can instantly activate an embedded control (e.g., button) at a particular place in time of the course to request a further assistance or access additional information related to the course, such as, for example, initiating a live support session with an agent or specialist, accessing a self-support knowledgebase for further information, and/or accessing a social community for a particular discussion forum related to the course, etc.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via services APIs of the service center, without a need of a real person involved. Such processing logic and/or functional blocks can be implemented in software, hardware, or a combination thereof.

Figure 2:
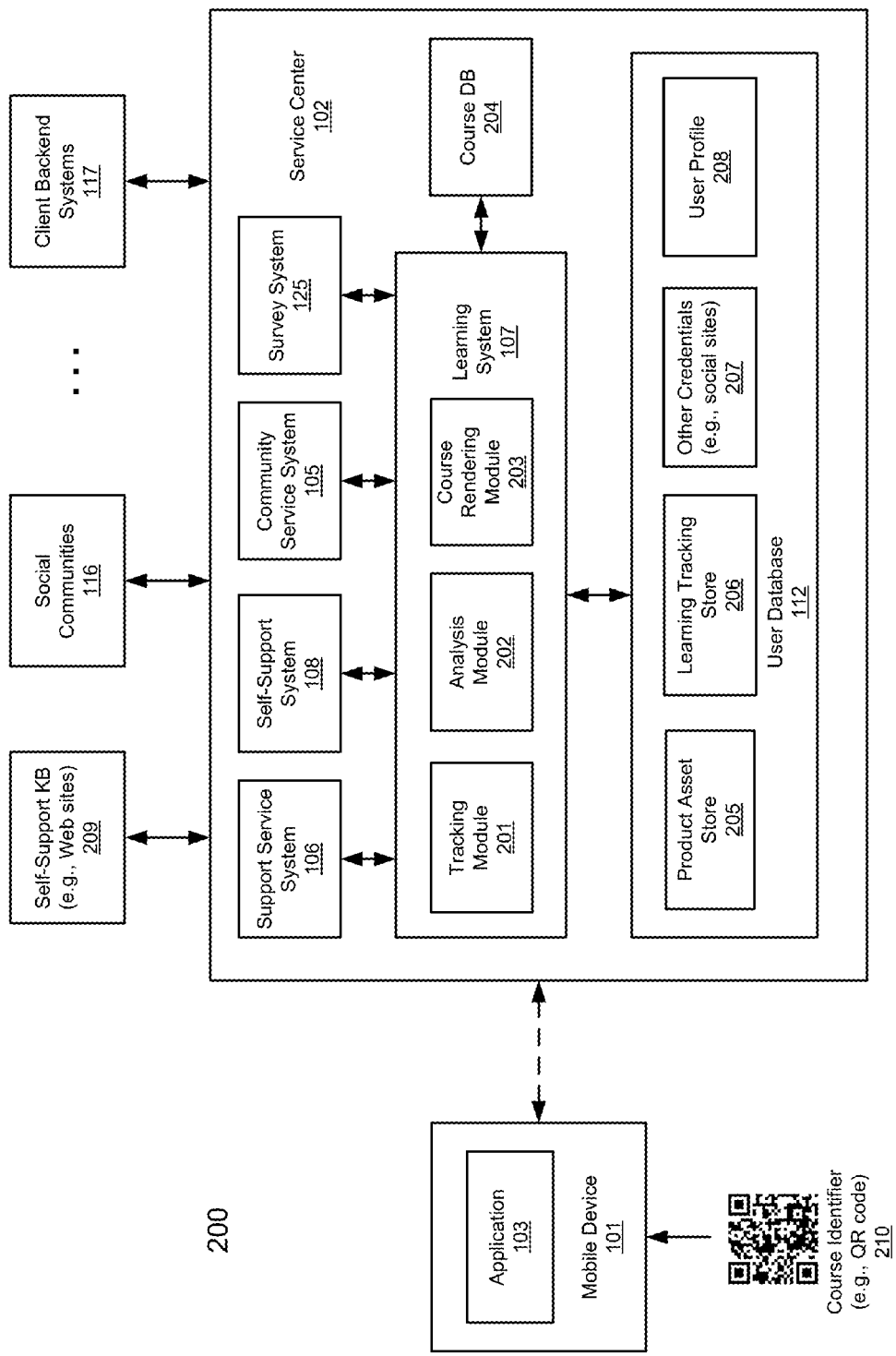
FIG. 2 is a block diagram illustrating an example of a service center according to another embodiment of the invention.

FIG. 2 is a block diagram illustrating a support service system of a service center according to one embodiment of the invention. System 200 may be implemented as part of system 100 of FIG. 1. Referring to FIG. 2, according to one embodiment, learning system 107 includes tracking module 201, analysis module 202, and course rendering module 203, which are configured to provide learning or training courses compiled in course database 204 to a customer such as user of mobile device 101. The courses are provided to users by learning system 107 on behalf of a product provider that provides the product described by the learning course.

In one embodiment, in response to a request for accessing an online course, course rendering module 203 of learning system 107 identifies, renders, and transmits a course segment to a remote device of a user. The request may include a machine-readable code (e.g., QR code) that is obtained via mobile device 101 of the user by scanning machine-readable code 210 disposed on a product using a scanner or camera of mobile device 101. Machine-readable code 210 can be a variety of codes such as a QR code, a serial number, a UPC code, a barcode, an image, etc. The course or courses are identified from course database 204 based on machine-readable code 210 without having the user to specifically provide detailed information identifying the courses.

For example, the user can use its mobile device to scan a product identification code on the exterior surface of the product and access the courses provided by learning system 107. Note that the product in question does not have to be a registered product; it could just be a product that may be potentially purchased by the user, as long as the user is a registered member of service center 102 and/or a product provider of the product in question is a client of service center 102.

Based on machine-readable code 210 received from mobile device 101, according to one embodiment, functional capabilities (e.g., display resolution, network bandwidth, processing power, current geographic location of the device, etc.) of mobile device 101 may be automatically determined by service center 102, for example, without user intervention. Some of the device information may be collected when mobile device 101 was registered with service center 102 by the user. The courses may be rendered (e.g., in a form of a media stream) by course rendering module 203 in view of the capabilities of the mobile device such that the courses can be properly presented by mobile device 101. The courses may also be rendered based on user's previous learning actions. For example, based on the machine-readable code, course rendering module 203 is configured to determine the previous endpoint of a course segment and to render a course segment having a starting point that will "pick up" the previous endpoint, such that the user does not have to repeat the previously viewed content. The user learning history may be monitored and tracked by tracking module 201.

While the user navigates the course segment, according to one embodiment, user interaction with the course is tracked and captured by tracking module 201 of service center 102. The user interaction may be monitored and tracked by application 103 running at mobile device 101 and periodically transmitted from mobile device 101 to learning system 107 of service center 102 over a network. In one embodiment, analysis module 202 is configured to perform an analysis on the tracking data and to generate an analysis report. The analysis report may be provided to a product provider to allow the product provider to determine customer satisfaction or other product and marketing purposes (e.g., targeted advertisements). In this situation, a product provider is a client of service center 102 and the analysis report may be transmitted to the client such as client backend systems 117. Alternatively, analysis module 202 may invoke a customer satisfaction (CSAT) system, which may be maintained within service center 102 or by a remote third party vendor, to compute a customer satisfaction metrics and provide the customer satisfaction metrics to the client.

In one embodiment, based on the analysis, a new or related product is identified and recommended to the user. If the user decides to acquire the recommended product, service center 102 may allow the user to access an eCommerce site to acquire the recommended product. Service center 102 is configured to automatically register the product and store the registered product information in product asset store 205 associated with the user. Further detailed information concerning these embodiments can be found in the above incorporated-by-reference applications.

In one embodiment, based on the analysis, course rendering module 203 is configured to customize or generate further courses for the user or for other users who may have similar concerns. The analysis report can also be utilized to generate a new article or modify an existing article of a self-support knowledgebase (e.g., a Web site hosting solutions to common issues such as frequently asked questions or FAQ). The analysis report may also be utilized to update or spin off a discussion thread for further discussion in an online community or social community via community service system 105.

According to one embodiment, a course is presented in a manner such that a user can get in touch with an agent for live support, a specialist associated with a self-support knowledgebase, and/or a friend of a social community to further engage discussions of topics associated with the course and/or the associated product. In one embodiment, if the user is unsatisfied with a description of a particular course, the user can instantly activate an embedded control (e.g., a button or a link) at a particular place in time to request a further assistance or access additional information related to the course. For example, during or at the end of a learning segment, survey system 125 may transmit a survey inquiry to mobile device 101 to prompt the user whether the user is satisfied with the particular learning segment and collect the user response for further analysis. Meanwhile, one or more buttons or links are presented to the user to allow the user to initiate a further action.

For example, while navigating a course according to one embodiment, a user can activate a control or button embedded or associated with the course to request a live support with an agent or specialist. Based on the request received at the service center and the tracking data collected during the course, support service system 106 is configured to identify and select an agent who is familiar with the description of the course and/or the product in question to get in touch with the user via a communications channel (e.g., voice, chat, email) that is preferred by the user (e.g., based on user preference previously configured and stored as part of a user profile) and is available (e.g., based on a configuration of a client that is associated with the course) to the agent. In addition, support service system 106 is configured to compile all the necessary information concerning the user (e.g., user preference, user interactive history), the product in question, the learning course currently presented to the user, as well as the tracking data of the learning course collected by tracking module 201 and the analysis performed by analysis module 202, generating a support session context. Support service system 106 then transmits the support session context to the selected agent to be available at the desktop of the agent, such that the agent has all the necessary information during a live support session, as described in the above incorporated-by-reference applications.

Alternatively, the user can activate a control or button from the course to request accessing a self-support knowledgebase (e.g., Web site) for a particular article that is related to the content of the course. In response to the request, self-support system 108 is configured to identify one or more articles that are related to content of the learning course segment at the point in time from a self-support knowledgebase hosted by a knowledgebase server such as a Web server. The one or more articles may be identified based on the tracking data of the learning course collected by tracking module 201 and the analysis performed by analysis module 202. Self-support system 108 is configured to transmit one or more links referencing the articles to mobile device 101 such that the user can access the articles via the links from mobile device 101. In addition according to one embodiment, from the self-support articles, the user can also initiate a live support session with an agent of service center 102 via a link or button presented along with the articles. Alternatively, from the self-support articles, the user can access a related discussion forum hosted by an online community via community service system 105. Furthermore, since the user accesses the community via self-support system 108, the user interaction with the articles can be pinpointed and tracked by the self-support system and fed back to service center 102 for further analysis. For example, based on the user interaction with the learning course and self-support articles, self-support system 108 is configured to generate further self-support articles to be posted in the self-support knowledgebase.

Furthermore, a user can also activate a control or button from the course to request access or participation in a discussion forum of an online community that is related to content of the course. In response to the request, community service system 105 is configured to identify a discussion thread that is hosted by an online community and related to the content of the course at the point in time. Community service system 105 transmits information regarding the discussion thread to mobile device 101. According to one embodiment, community service system 105 may automatically log into the online community on behalf of the user using the corresponding credentials (e.g., username and password) that have been previously provided to service center 102 and stored as part of database 207. As a result, the user does not have to provide the same at the point in time, as described in the above incorporated-by-references applications.

Alternatively, according to another embodiment, the user can also share the course segment with its friends in an online community. For example, the user can activate a "share" button on a graphical user interface presenting the course to request sharing the course segment. In response to the request, community service system 105 is configured to log in and access the online community and to request the sharing of the course by transmitting a link of the course to the online community on behalf of the user. In this way, the user does not have to individually access the online community in which the user has to launch another browser session and provide the necessary credentials in order to log into the online community, which sometimes is inconvenient. Furthermore, since the user accesses the community via community service system 105, the user interaction with the community can be pinpointed and tracked by the community and provided back to service center 102 for further analysis as described above.

Figure 3:
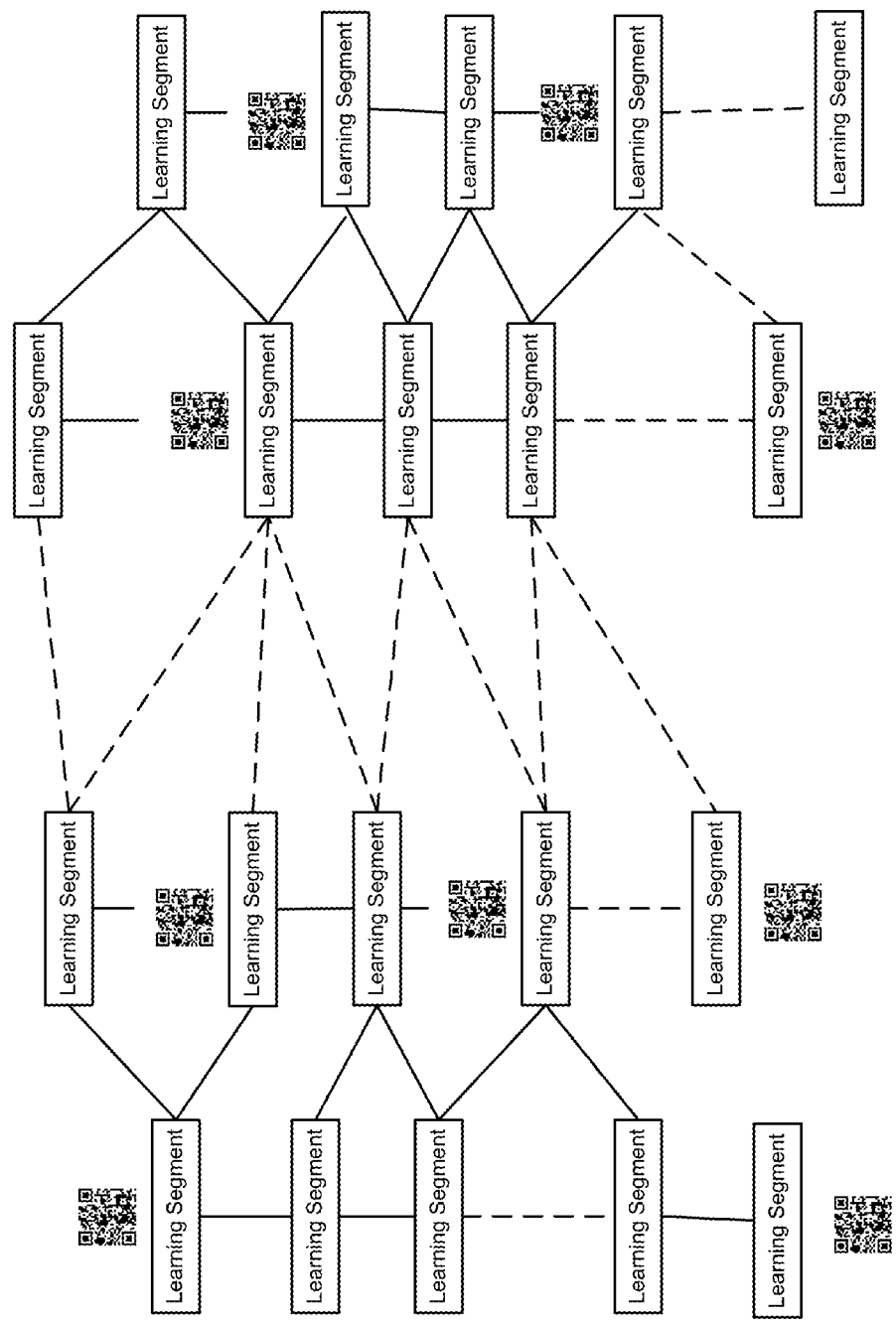
FIG. 3 is a block diagram illustrating a structure of a learning course according to one embodiment of the invention.

Learning courses can be organized and maintained in a variety of formats or structures. FIG. 3 is a block diagram illustrating a structure of a learning course according to one embodiment of the invention. Referring to FIG. 3, a course may include multiple course segments and some of the course segments may represent entry points to the course at various stages, which may be determined by user's initial information inquiry into a topic, a category, a product, a service, and/or a support process in which the user is seeking education. For example, each entry point may be represented by a machine-readable code as shown in FIG. 3. When a machine-readable code is scanned and received by the learning system, the received machine-readable code is compared with those representing the entry points of course segments. A course segment associated with an entry point having a matched machine-readable code is identified and transmitted to user's device. Note that the learning course as shown in FIG. 3 is described for the purpose of illustration only. Some course segments may be closely related to each other (represented by solid lines) and some are remotely related to each other (represented by dash lines). Other formats may also be applied.

Figure 4:
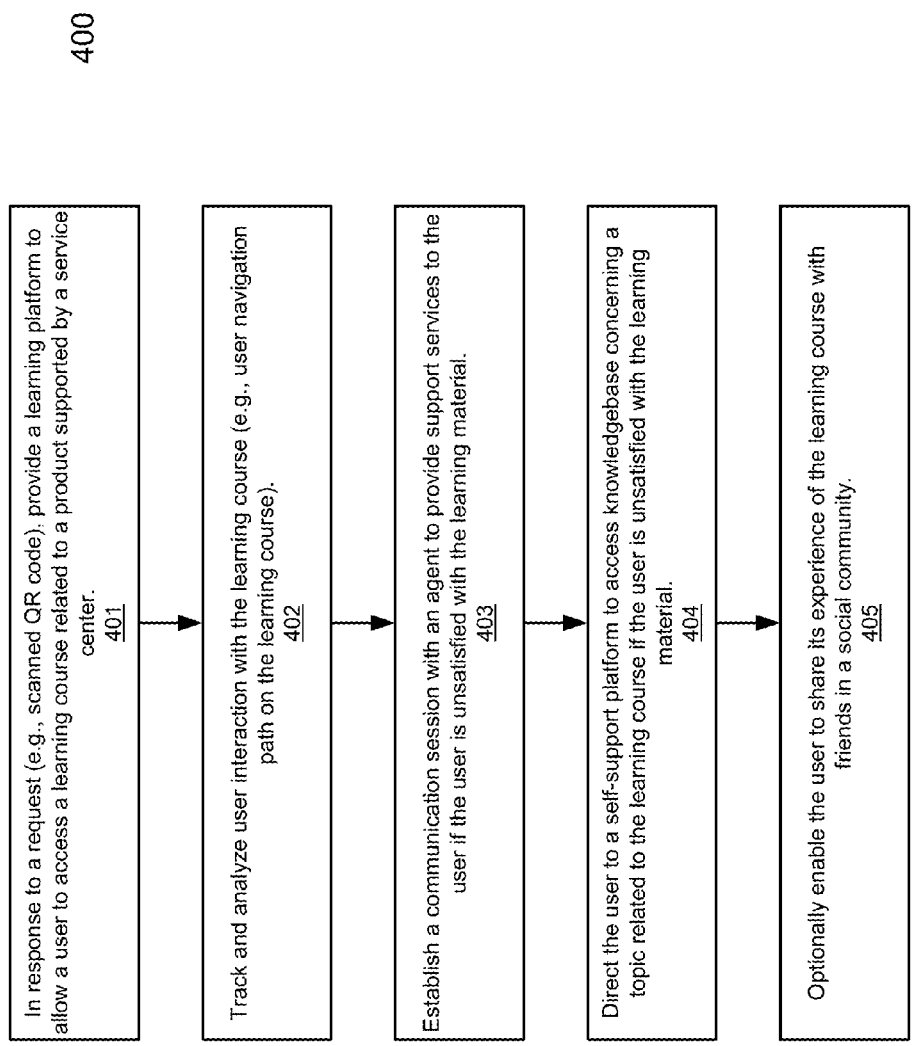
FIG. 4 is a flow diagram illustrating a method for providing learning courses to users according to one embodiment of the invention.

FIG. 4 is a flow diagram illustrating a method for providing learning courses to users according to one embodiment of the invention. Method 400 may be performed by learning system 107 described above. Referring to FIG. 4, at block 401, in response to a request (e.g., scanned QR code), a learning platform is provided to allow a user to access a learning course related to a product supported by a service center. The learning course may be identified and selected based on a machine-readable code obtained by scanning the code using a scanner of a mobile device of the user. The product may or may not be registered by the user, as long as the product is supported by the service center (e.g., a product provider is a client of the service center). At block 402, user interaction with the learning course is tracked and analyzed. The user interaction may be monitored by an application running at a mobile device of the user and received at the service center. Alternatively, the user interaction may be tracked by a hosting platform that hosting the learning course. At block 403, if the user is unsatisfied with the learning course (e.g., based on a survey conducted by the service center via the course), a communication session between a user and an agent for a live support session. Alternatively, at block 404, the user is directed to a self-support platform to access certain articles that may be related to a product of the learning course. Furthermore, at block 405, the user can access a discussion forum associated with the learning course in an online community.

Figure 5:
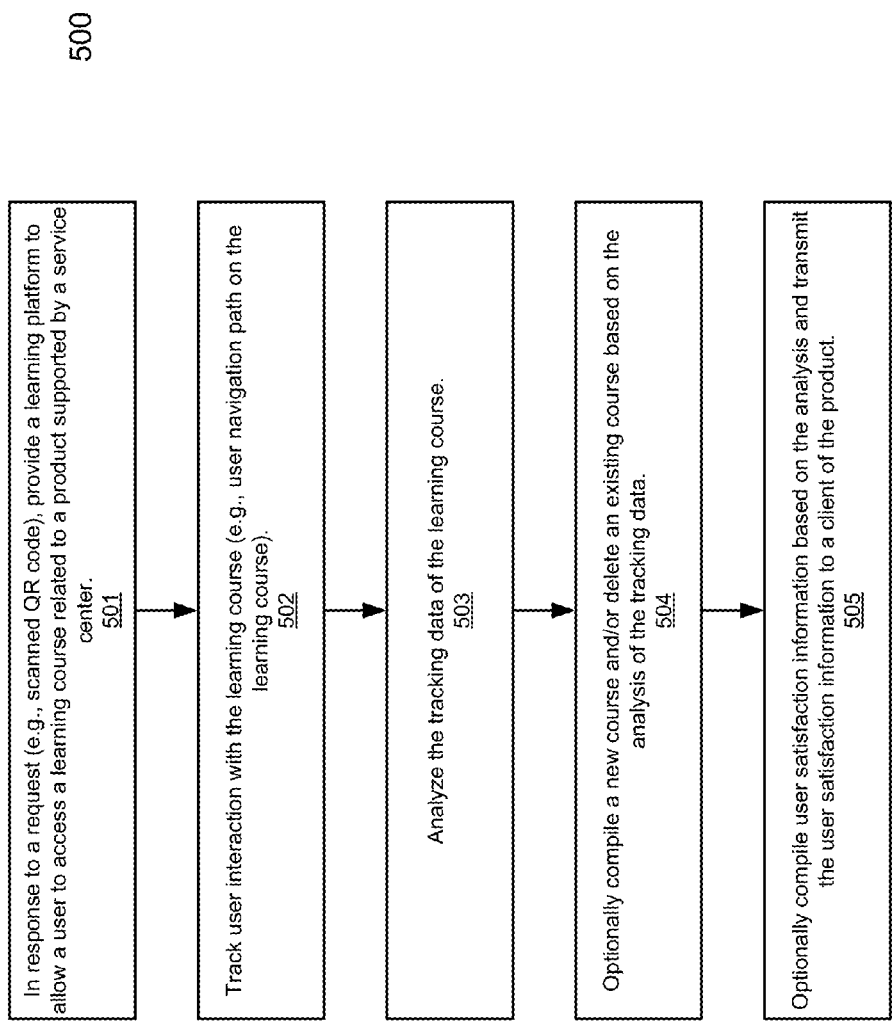
FIG. 5 is a flow diagram illustrating a method for providing learning courses to users according to another embodiment of the invention.

FIG. 5 is a flow diagram illustrating a method for providing learning courses to users according to another embodiment of the invention. Method 500 may be performed by learning system 107 described above. Referring to FIG. 5, at block 501, in response to a request (e.g., scanned QR code), a learning platform is provided to allow a user to access a learning course related to a product supported by a service center. The learning course may be identified and selected based on a machine-readable code obtained by scanning the code using a scanner of a mobile device of the user. The product may or may not be registered by the user, as long as the product is supported by the service center (e.g., a product provider is a client of the service center). At block 502, user interaction with the learning course is tracked and analyzed at block 503. At block 504, a new or updated course may be generated based on the analysis of the tracking data. At block 505, user satisfaction data is compiled based on the analysis and the user satisfaction data is transmitted to a client of the product (e.g., product provider). In addition, another product may be recommended to the user based on the analysis.

Figure 6:
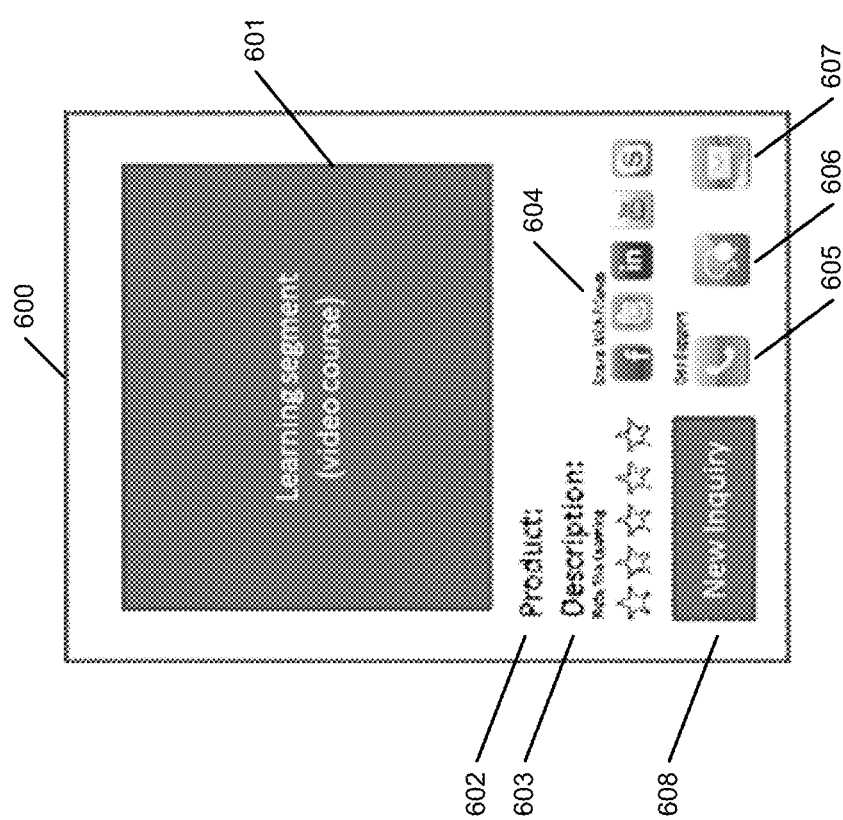
FIG. 6 is a screenshot illustrating a graphical user interface (GUI) of a course platform according to one embodiment of the invention.

FIG. 6 is a screenshot illustrating a graphical user interface (GUI) of a course platform according to one embodiment of the invention. GUI 600 may be presented by mobile device 101. Referring to FIG. 6, GUI 600 includes a display area to display a learning course, for example, in a video stream received from a service center over a network. In addition, GUI 600 includes a product identifier 602 identifying a product related to the learning course and a short description 603 about the product and/or the course. Further a user can activate control 604 to access a discussion forum that is related to the course or product. Alternatively, the user can request to contact an agent, for example, via voice 605, chat 606, and email 607. A user can also initiate or request a new course by activating control 608. Note that any of the buttons or controls as shown can be activated by clicking, tapping, or via a voice interactive command. Other configurations may exist.

As described above, a course can have a series of smaller course segments in various lengths (e.g., 15 to 60 seconds) which may constitute the overall course. After viewing a learning segment, the User is prompted to continue with more information on the initial inquiry or start a new inquiry. By selecting "more information," the user is passed on to the next logical learning segment based on the initial inquiry. By selecting a "new inquiry" the user is presented a new learning segment based on the new topic, category, product, service, support or other. In either case the support center collects data on all scans (requests) from the user as well as any and all learning segments viewed in part or in whole.

All data collected will be utilized to develop learning plans which support the primary requests of the user and their needs. The elimination of learning segments that are either not wanted or needed by the user aids to help controlling the costs of content creation (do not want to build what people don't want or use), providing a better experience to the user by not providing unwanted content, and collecting metrics on the precise targets of need which can then be provided back to retailers, manufacturers, service companies to ensure the proper support is available for the user. At any time during the viewing of learning content the user has the ability to add the product spoken about to a wish list which will allow them to view in further detail, compare to other products and services or to keep as a possible future purchase item. A user may enter specific information about a product or service to access learning segments to educate them on their pending purchase. A learning course may prompt a user throughout a course or learning segment in order to collect user information such as sex, age, size, color preference, product type, product preference, spending habits, buying behavior, preferred brands, and other demographic information, etc.

The collected information may be utilized to understand an individual in order to intelligently provide other services such as possible upsell or cross sell for products and services. All of the information will be persisted with their user registration to the support center. Here the system will have information additionally about their recent and past purchases in which to leverage for suggested learning segments that would benefit the user. A learning course provides only the necessary learning segments to the user based on the collected information, which each learning segment educating the user on "why" the product is recommended (in the example, the user takes 5 learning segments, gaining brand knowledge along the way). A learning segment uses user information to suggest the best available product. After each learning segment, the user is asked questions/provided options, which guides them to the next appropriate learning segment—eventually leading to the suggested product. A learning course provides the user a summary of reasons for the suggested product. All learning segments (e.g., videos, tutorials, information) are available to the user for future reference.

Further, a user is able to request phone (click to talk), chat (click to chat) or email support channel at any point during the learning course in the event that information was not available, not correct or for any other reason. The available channel a user is allowed to select is determined by: a) the client program supporting the products or services; and b) the channels the user has selected as the channels they prefer to communicate via. The user cannot utilize a preferred channel if the client is not allowing that channel. At any time in the process a user has the ability to share what they have viewed (learned) with their friends on Facebook, Twitter, other who they believe will benefit from the learning content.

The techniques described above can be applied to a variety of situations. For example, a retail customer is looking for product-specific sales, support, troubleshooting or policy information for which a service center provides customer phone support and online managed website support. In this example, the retail customer accesses online knowledge engine and asks a support question that is not available there. Support specialists collaborate on a knowledge article and determine a new or better solution. The retail customer would like more information about a specific product and utilizes mobile its mobile device and QR scanner application to scan product QR code to access product information (eLearning course). The QR code app completes scan and takes the retail customer to a URL for the product information.

Meanwhile, the learning system determines a video resolution best suited for the mobile device and displays an eLearning course on the specifics of the desired product. The retail customer walks through the eLearning course performing any interactive requests as needed. The retail customer completes the course and is prompted whether their questions about a specific product was answered. If the retail customer selects "no" the customer is prompted to request more assistance (e.g., one touch button). The retail customer has the option to enter a user community for assistance or to enter into a self-help system. It is assumed that the retail customer selects the self-help system (knowledge engine) and types an inquiry question. The knowledge engine checks its database of professionally developed answers in the collaboration platform and returns best possible answers to retail customer. The knowledge engine also records customer data such as IP location, browser, mobile device, time of day, etc.

If the retail customer is satisfied (via a survey) with the response, the system completes an interaction wrap up by saving all interaction activity. If the customer is unsatisfied, the system may flag to allow an agent to follow up with the customer subsequently. Alternatively, the retail customer can request a live support session by activating the "one touch" support button. In this example, it is assumed that the customer selects a chat request with an available specialist. The system receives a chat request and looks for an available specialist. An available specialist is located and the retail customer is forwarded to the specialist for support. Based on the retail customers activity the specialist identifies an eLearning course the customer has viewed and the self-help questions asked. The specialist works with the customer to identify an answer to their question and the retail customer receives the answers to their questions, and the two are disconnected. In addition, the specialist completes interaction by performing standard wrap up duties as well as submitting the new questions and associated answer for review and approval to add to the self-help system. The retail customer is prompted to evaluate the quality of the support interaction and the system completes an interaction wrap up by saving all interaction activity, survey, etc. Furthermore, the support specialist may identify that the knowledge article (answer) is not completely accurate and submits changes on the fly, and provides the modified answer to the customer at the point in time.

According to some embodiments, community specialists may monitor the knowledge system to identify certain "unanswered" questions from a retail customer knowledge engine which provides reporting on the answer quality. The unanswered questions are pulled into the collaboration community and tagged as a "new question" to be worked on by support specialists or subject matter experts (SME's). The support specialists and/or SME's collaborate to construct and document a resolution to the retail customers' question or to enhance answers for low quality answers (per retail customer feedback) in the collaboration platform. Clients-approve support specialists and/or SME's collaborative answers that are ready to be professionally developed. Once the document is completed, the support specialist/other will tag the document "for approval." Questions are processed through an approval stream once created. Technical writer professional constructs the professionally answered question in a clean layout. Once the new professional answer is approved then the document is to be tagged with an "approved" tag for publishing in a subspace. Upon completion of all approvals, the new answer is mapped (via a URL) to the right question in the knowledge system to allow for a proper answer the next time the question is asked by a retail customer (or any other customer type). Once the mapping of question to answer is complete, the document is to be tagged as "published." An answer engine is now able to leverage the new "published" content for the next self-help request from a retail customer. Customers who previously asked the question and did not get the appropriate response are notified with the new professional answer, for example, as a follow-up action.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing media content, the method comprising:

receiving, at a server having a processor and a memory, a request from a remote device for accessing a learning course describing operations of a product that has been acquired by a user of the remote device and registered with and stored in a product asset store associated with the user of the server, wherein the product asset store is maintained in a persistent storage device of the server, the product assets store storing product information of one or more products the user has registered with the server, wherein the server maintains a plurality of product asset stores for a plurality of users for their respective registered products, wherein the remote device is a mobile device and the request is received from a mobile application running within the mobile device;

extracting, by a course rendering module executed by the processor, a course identifier from the request, wherein the course identifier includes a machine-readable code that was obtained by scanning the machine-readable code on the registered product using a scanner of the remote device;

identifying, by the course rendering module, a learning course from a plurality of learning courses stored in a course database of the server based on the course identifier, without having the user to specifically provide detailed information about the learning course, wherein each of the plurality of learning courses is identified by a respective machine-readable code, wherein at least one of the learning courses includes a plurality of course segments, each being identified by a unique machine-readable code, and wherein identifying a learning course from a plurality of learning courses comprises searching in the course database by matching the extracted machine-readable code against a plurality of machine-readable codes representing the plurality of learning courses to identify a course segment having a machine-readable code matching the extracted machine-readable code;

transmitting, by the course rendering module, a media stream representing the learning course to the remote device to allow a user of the remote device to navigate the learning course, without requiring the user to directly access a training facility of a product provider associated with the registered product, wherein one or more options are presented to allow the user to initiate a further action during navigating the learning course, including initiating a live communication session with a support agent;

tracking, by a tracking module executed by the processor, user interaction with the learning course, including periodically receiving user interactive data from the mobile application and storing the user interactive data in a learning tracking store of a user database on the server;

performing, by an analysis module executed by the processor, analysis on the user interactive data in the learning tracking store;

generating, by the analysis module, an analysis result, wherein the analysis result is utilized to generate or identify a subsequent learning course specifically tailored to the user; and transmitting the analysis result to the product provider associated with the registered product for the purpose of determining customer satisfaction.

2. The method of claim 1, further comprising:
prior to receiving the request for accessing a learning course, receiving, at the server, a login request from the mobile application;
transmitting login information to the mobile device to present a plurality of login options to the user, including a username/password login option, a voice login option, and an image login option; and
in response to login credential received from the mobile application representing one of the username/password, voice, and an image captured by the mobile device at the server, authenticating the user by comparing the received credential with a corresponding one previously registered with a user database of the server and stored in a user profile of the user.

3. The method of claim 2, wherein authenticating the user comprises:
receiving first credential from the mobile application for logging into the server via a first login option;
authenticating the user based on the first credential, generating an authentication result;
accessing a user login preference from a user profile of the user to determine whether a second login option is required based on the authentication result;
in response to determining that the second login option is required, transmitting second login information to the mobile application requesting the second login option; and
in response to receiving second credential received from the mobile application, authenticating the user using the second login option based on the second credential.

4. The method of claim 1, further comprising:
determining, by the course rendering module, a functional capability of the remote device based on the request, including at least one of a geographic location of the remote device, display resolution, network bandwidth, or processing power;
rendering, by the course rendering module, the learning course to a format that is suitable to be presented at the remote device at the point in time; and
storing the functional capability in a user profile in the user database of the server to render subsequent learning courses suitable to be presented at the remote device in the future.

5. The method of claim 4, further comprising:
in response to ending of the learning course, transmitting, by a survey system, a survey inquiry to the remote device to determine whether the user is satisfied with the learning course; and
presenting at least one option available to the learning course if the user is unsatisfied with the learning course.

6. The method of claim 5, further comprising:
in response to a first option selected by the user, identifying by a support service system an available agent based on expertise of the agent in relation to the learning course the user has indicated dissatisfaction with;
establishing a communications session between the user and the agent using a communications channel that is preferred by the user and available to the agent; and
transmitting user information of the user, product information of the registered product, and tracking data of the learning course to the agent to allow the agent to provide a live support service to the user.

7. The method of claim 6, wherein establishing a communications session between the user and the agent using a communications channel that is preferred by the user and available to the agent comprises:
accessing the user profile in the use database associated with the user to determine a first set of communication channels, wherein the first set of communication channels has been previously configured by the user and stored in the user profile as a user preference; p1 accessing a client database associated with the product provider of the registered product to determine a second set of communication channels, wherein the second set of communication channels has been previously configured by an administrator of the product provider; and
comparing the first set and the second set of communication channels to select the communication channel used for the live communication session, wherein the selected communication channel exists in both the first set and the second set of communication channels.

8. The method of claim 5, further comprising:
in response to a second option selected by the user, identifying, by a self-support system, an article of a knowledgebase server based on the tracking data of the learning course, wherein the article describing a possible solution associated with a particular segment of the learning course that the user is accessing; and
transmitting a link referencing the identified article to the remote device to allow the user to access the identified article of the knowledgebase server via the link, wherein the identified article includes a control button that allows the user to initiate a live communication session with an agent by activating the control button.

9. The method of claim 8, further comprising in response to an activation of the control button of the identified article, establishing, by a support service system, a communications session between the user and an agent to enable the agent to conduct a live session with the user to resolve user's concerns, if the user is still unsatisfied in view of the article provided by the knowledgebase server.

10. The method of claim 9, further comprising:
generating a second article based on the live session between the user and the agent; and
publishing the second article on the knowledgebase server.

11. The method of claim 5, further comprising:
in response to a third option selected by the user, identifying, by a community service system, a discussion thread of a social community based on the tracking data of the learning course, wherein the discussion thread discussing a possible solution to a product associated with a particular segment of the learning course that the user is accessing; and
transmitting a link referencing the discussion thread to the remote device to allow the user to participate in the discussion thread via the link.

12. The method of claim 11, further comprising:
receiving a request from the mobile application indicating for accessing the discussion thread in response to an activation of the link;
in response to the request, accessing a user database associated with the user to obtain a credential associated with the user for accessing the social community, wherein the credential has been previously provided by the user and stored in the user database; and
automatically logging into the social community on behalf of the user without requiring the user to provide the credential at a point in time to enable the user accessing the social community.

13. The method of claim 1, further comprising:
identifying a second product that is related to the registered product based on the analysis result;
accessing a product database associated with the server to obtain product information of the second product;
transmitting the product information to the remote device to be recommended to the user by the mobile application, wherein the transmitted product information further includes a link to a second server from which the user can acquire the second product; and
in response to a notification indicating that the user has acquired the second product, automatically registering the second product by storing detailed identifying information of the second product in the product asset store of the user.

14. A non-transitory machine-readable storage medium having instructions stored therein, which when executed by a processor, cause the processor to perform a method for providing training, the method comprising:
receiving, at a server having a processor and a memory, a request from a remote device for accessing a learning course describing operations of a product that has been acquired by a user of the remote device and registered with and stored in a product asset store associated with the user of the server, wherein the product asset store is maintained in a persistent storage device of the server, the product assets store storing product information of one or more products the user has registered with the server, wherein the server maintains a plurality of product asset stores for a plurality of users for their respective registered products, wherein the remote device is a mobile device and the request is received from a mobile application running within the mobile device;
extracting, by a course rendering module executed by the processor, a course identifier from the request, wherein the course identifier includes a machine-readable code that was obtained by scanning the machine-readable code on the registered product using a scanner of the remote device;
identifying, by the course rendering module, a learning course from a plurality of learning courses stored in a course database of the server based on the course identifier, without having the user to specifically provide detailed information about the learning course, wherein each of the plurality of learning courses is identified by a respective machine-readable code, wherein at least one of the learning courses includes a plurality of course segments, each being identified by a unique machine-readable code, and wherein identifying a learning course from a plurality of learning course comprises searching in the course database by matching the extracted machine-readable code against a plurality of machine-readable codes representing the plurality of learning courses to identify a course segment having a machine-readable code matching the extracted machine-readable code;
transmitting, by the course rendering module a media stream representing the learning course to the remote device to allow a user of the remote device to navigate the learning course, without requiring the user to directly access a training facility of a product provider associated with the registered product wherein one or more options are presented to allow the user to initiate a further action during navigating the learning course, including initiating a live communication session with a support agent;
tracking, by a tracking module executed by the processor, user interaction with the learning course, including periodically receiving user interactive data from the mobile application and storing the user interactive data in a learning tracking store of a user database on the server;
performing, by the analysis module executed by the processor, analysis on the user interactive data in the learning tracking store;
generating, by the analysis module, an analysis result, wherein the analysis result is utilized to generate or identify a subsequent learning course specifically tailored to the user; and
transmitting the analysis result to the product provider associated with the registered product for the purpose of determining customer satisfaction.

15. The non-transitory machine-readable storage medium of claim 14, wherein the method further comprises:
prior to receiving the request for accessing a learning course, receiving, at the server, a login request from the mobile application;
transmitting login information to the mobile device to present a plurality of login options to the user, including a username/pas sword login option, a voice login option, and an image login option;
in response to login credential received from the mobile application representing one of the username/password, voice, and an image captured by the mobile device at the server, authenticating the user by comparing the received credential with a corresponding one previously registered with a user database of the server and stored in a user profile of the user; and
storing the analysis result in a learning tracking store in the user database of the server to generate or identify subsequent learning courses specifically tailored to the user based on the stored analysis results.

16. The non-transitory machine-readable storage medium of claim 14, wherein the method further comprises:
determining, by the course rendering module, a functional capability of the remote device based on the request, including at least one of a geographic location of the remote device, display resolution, network bandwidth, or processing power;
rendering the learning course to a format that is suitable to be presented at the remote device at the point in time; and storing the remote device functional capability in a user profile in the user database of the server to render subsequent learning courses suitable to be presented at the remote device in the future.

17. The non-transitory machine-readable storage medium of claim 16, wherein the method further comprises:
in response to the learning course ending, transmitting, by a survey system, a survey inquiry to the remote device to determine whether the user is satisfied with the learning course; and
presenting at least one option available to the learning course if the user is unsatisfied with the learning course.

18. The non-transitory machine-readable storage medium of claim 17, wherein the method further comprises:
in response to a first option selected by the user, identifying, by a support service system, an available agent based on expertise of the agent in relation to the learning course the user has indicated dissatisfaction with;
establishing a communications session between the user and the agent using a communications channel that is preferred by the user and available to the agent; and
transmitting user information of the user, product information of the registered product, and tracking data of the learning course to the agent to allow the agent to provide a live support service to the user.

19. The non-transitory machine-readable storage medium of claim 17, wherein the method further comprises:
in response to a second option selected by the user, identifying, by self-support system, an article of a knowledgebase server based on the tracking data of the learning course, wherein the article describing a possible solution associated with a particular segment of the learning course that the user is accessing; and
transmitting a link referencing the identified article to the remote device to allow the user to access the identified article of the knowledgebase server via the link, wherein the identified article includes a control button that allows the user to initiate a live communication session with an agent by activating the control button.

20. The non-transitory machine-readable storage medium of claim 19, wherein the method further comprises establishing, by a support service system, a communications session between the user and an agent to enable the agent to conduct a live session with the user to resolve user's concerns, if the user is still unsatisfied in view of the article provided by the knowledgebase server.

21. The non-transitory machine-readable storage medium of claim 20, wherein the method further comprises:
generating a second article based on the live session between the user and the agent; and
publishing the second article on the knowledgebase server.

22. The non-transitory machine-readable storage medium of claim 17, wherein the method further comprises:
in response to a third option selected by the user, identifying, by a community service system, a discussion thread of a social community based on the tracking data of the learning course, wherein the discussion thread discussing a possible solution to a product associated with a particular segment of the learning course that the user is accessing; and
transmitting a link referencing the discussion thread to the remote device to allow the user to participate in the discussion thread via the link.

23. A data processing system, comprising:
a processor;
a memory coupled to the processor;
a persistent storage device;
an application programming interface (API), executed from the memory by the processor, to receive a request from a remote device for accessing a learning course describing operations of a product that has been acquired by a user of the remote device and registered with and stored in a product asset store associated with the user of the data processing system, wherein the products asset store is maintained in the persistent storage device, the product assets store storing product information of one or more products the user has registered with the data processing system, wherein the data processing system maintains a plurality of product asset stores for a plurality of users for their respective registered products, wherein the remote device is a mobile device and the request is received from a mobile application running within the mobile device; and
a learning system executed by the processor, in response to the request, to extract, by a course rendering module executed by the processor, a course identifier from the request, wherein the course identifier includes a machine-readable code that was obtained by scanning the machine-readable code on the registered product using a scanner of the remote device, identify, by the course rendering module, a learning course from a plurality of learning courses stored in a course database of the data processing system based on the course identifier, without having the user to specifically provide detailed information about the learning course, wherein each of the plurality of learning courses is identified by a respective machine-readable code, wherein at least one of the learning courses includes a plurality of course segments, each being identified by a unique machine-readable code, wherein identifying a learning course from a plurality of learning courses comprises searching in the course database by matching the extracted machine-readable code against a plurality of machine-readable codes representing the plurality of learning courses to identify a course segment having a machine-readable code matching the extracted machine-readable code, to transmit, by the course rendering module, a media stream representing the learning course to the remote device to allow a user of the remote device to navigate the learning course, without requiring the user to directly access a training facility of a product provider associated with the registered product, and to present on the remote device display one or more options to allow the user to initiate a further action during navigating the learning course, including initiating a live communication session with a support agent, wherein the learning system is configured to
track, by a tracking module executed by the processor, user interaction with the learning course, including periodically receiving user interactive data from the mobile application and storing the user interactive data in a learning tracking store of a user database on the data processing system,
perform, by an analysis module executed by the processor, analysis on the user interactive data in the learning tracking store;
generate, by the analysis module, an analysis result, wherein the analysis result is utilized to generate or identify a subsequent learning course specifically tailored to the user, and
transmit the analysis result to the product provider associated with the product for the purpose of determining customer satisfaction.

24. The system of claim 23, wherein the learning system is configured to
- prior to receiving the request for accessing a learning course, receive, at the data processing system, a login request from the mobile application,
- transmit login information to the mobile device to present a plurality of login options to the user, including a username/password login option, a voice login option, and an image login option,
- in response to login credential received from the mobile application representing one of the username/password, voice, and an image captured by the mobile device at the data processing system, authenticate the user by comparing the received credential with a corresponding one previously registered with a user database of the data processing system and stored in a user profile of the user,
- storing the analysis result in the user profile in the user database of the data processing system to generate or identify subsequent learning courses specifically tailored to the user based on the stored analysis results.

25. The system of claim 24, wherein the learning system is further configured to
- determine, by the course rendering module, a functional capability of the remote device based on the request, including at least one of a geographic location of the remote device, display resolution, network bandwidth, or processing power,
- render the learning course to a format that is suitable to be presented at the remote device at the point in time, and
- store the remote device functional capability in a user profile in the user database of the data processing system to render subsequent learning courses suitable to be presented at the remote device in the future.

26. The system of claim 24, wherein the learning system is configured to
- in response to the learning course ending, transmit, by a survey system executed by the processor, a survey inquiry to the remote device to determine whether the user is satisfied with the learning course, and
- present at least one option available to the learning course if the user is unsatisfied with the learning course.

* * * * *